United States Patent [19]

Shioiri et al.

[11] Patent Number: 5,063,493
[45] Date of Patent: Nov. 5, 1991

[54] METHOD OF PREPARING BROADCAST SEQUENCE CONTROL DATA AND APPARATUS FOR IMPLEMENTING SAID METHOD

[75] Inventors: Shigeo Shioiri; Kunio Kanda, both of Chiba, Japan

[73] Assignee: Somar Corporation, Tokyo, Japan

[21] Appl. No.: 353,930

[22] Filed: May 19, 1989

[51] Int. Cl.⁵ .................. G05B 19/04; G11B 27/02
[52] U.S. Cl. .................................. 364/192; 364/140; 369/83; 358/311; 360/14.3
[58] Field of Search ............... 364/140, 143, 188, 189, 364/191, 192; 369/14, 83; 360/14.1, 14.3; 358/310, 311; 380/14, 20, 21

[56] References Cited

U.S. PATENT DOCUMENTS

| | | | |
|---|---|---|---|
| 3,748,381 | 7/1973 | Strobele et al. | 360/14.1 |
| 4,428,001 | 1/1984 | Yamamura et al. | 358/335 |
| 4,709,277 | 11/1987 | Ninomiya et al. | 360/14.3 |
| 4,868,866 | 9/1989 | Williams, Jr. | 364/408 |

Primary Examiner—Jerry Smith
Assistant Examiner—Paul Gordon
Attorney, Agent, or Firm—Sughrue, Mion, Zinn, Macpeak & Seas

[57] ABSTRACT

An apparatus for preparing data for controlling the sequence of broadcasting, which apparatus comprises: a broadcasting material editing unit that edits a broadcasting material such as a broadcasting telecine film or broadcasting video tape, an adaptor with which the broadcasting material related information from the broadcasting material editing unit is converted to time-related data; a command only keyboard for preparing broadcast sequence control data; and an I/O device that feeds a broadcast sequence control unit with an output signal from the command only keyboard and an output signal from the adapter. The broadcast sequence control unit performs the necessary operations for preparing broadcast sequence control data. An output device stores or records the broadcast sequence control data which has been processed with the broadcast sequence control unit.

2 Claims, 4 Drawing Sheets

FIG. 6

Q SHEET FOR COTOBER 30, 1987

| BROADCAST TIME | JOB KEY | DATE | PROGRAM | PROGRAM DIVISION NO. |
|---|---|---|---|---|
| 7:00,00 | - - - - - - - - - - - - - - - - | | | |
| | - - - - - - - - - - - - - - - - | | | |
| | - - - - - - - - - - - - - - - - | | | |
| | - - - - - - - - - - - - - - - - | | | |
| 8:00,00 | CM | OCT 30, '87 | 0001 | T102 |
| 8:00,16 | OP | OCT 30, '87 | 0001 | T103 |
| 8:00,37 | HP | OCT 30, '87 | 0001 | T100 |
| | | | | |

FIG. 7

| JOB KEY | DATE | PROGRAM | PROGRAM DIVISION NO. | BROADCAST TIME h. min. sec. |
|---|---|---|---|---|
| HP | OCT 30, '87 | 0001 | T100 | 00. 55. 25 |
| YK | OCT 30, '87 | 0001 | T101 | 00. 00. 15 |
| CM | OCT 30, '87 | 0001 | T102 | 00. 00. 15 |
| OP | OCT 30, '87 | 0001 | T103 | 00. 00. 20 |
| CM | OCT 30, '87 | 0001 | T104 | 00. 00. 15 |
| ED | OCT 30, '87 | 0001 | T105 | 00. 00. 10 |
| | | | | |

METHOD OF PREPARING BROADCAST SEQUENCE CONTROL DATA AND APPARATUS FOR IMPLEMENTING SAID METHOD

BACKGROUND OF THE INVENTION

The present invention relates to a method of preparing data for controlling the sequence of broadcasting. The present invention also relates to an apparatus for implementing said method. More specifically, the present invention relates to a technique of preparing broadcast sequence control data that comprises: detecting a marker for identifying the contents to be broadcast that is set on a broadcasting material and converting the detected marker to time-related data; feeding a broadcast sequence control unit with a command for the contents of to be broadcast that correspond to said time-related data; and editing broadcast sequence control data either manually or automatically based on said contents to be broadcast and the data indicating the time required to broadcast said contents.

The prior art method of preparing data for controlling the sequence of broadcasting comprises reading information on a broadcasting material such as a broadcasting telecine film or broadcasting video tape that is displayed on a broadcasting material editing unit which edits the broadcasting material, and preparing a broadcast sequence control data sheet (hereinafter simply referred to as a "Q sheet") by manually writing in the desired preview time of the broadcasting material of interest on the basis of the information read. The data on the Q sheet is entered into a broadcast sequence control unit such as a personal computer through manipulation of an input device such as a keyboard, thereby controlling the broadcasting system and the broadcast time.

As described above, the prior art method of preparing broadcast sequence control data comprises reading broadcasting material-related information, in particular, the time required to broadcast the broadcasting material, that is displayed on a broadcasting material editing unit; preparing a Q sheet by manually writing in the desired time of preview of the broadcasting material on the basis of the information read; and entering the data on the Q sheet into a broadcast sequence control unit such as a personal computer through manipulation of an input device such as a keyboard. This method, however, has had the problem that the operator might prepare an incorrect Q sheet by making a mistake in reading the information about the broadcasting material that is displayed on the broadcasting material editing unit and a broadcast accident might occur on account of such incorrect Q sheet.

A further problem is that since Q sheets are prepared manually, considerable time is expended in performing calculations on the sexagenary system.

The present invention has been accomplished in order to solve these problems of the prior art.

SUMMARY OF THE PRESENT INVENTION

An object, therefore, of the present invention is to provide a method of preparing data for controlling the sequence of broadcasting that is capable of reducing the chance of broadcast accidents of occurring on account of incorrect broadcast sequence control data, as well as an apparatus for implementing such an improved method.

Another object of the present invention is to provide a technique that is capable of shortening the editing time required to prepare data for controlling the sequence of broadcasting.

These and other objects of the present invention, as well as the novel features thereof will become apparent by reading the following description in the specification and the accompanying drawings, wherein:

FIG. 6 illustrates the contents of a Q sheet; and

FIG. 7 illustrates the contents of broadcast sequence control data prepared in accordance with the embodiment shown in FIG. 1.

DETAILED DESCRIPTION OF THE INVENTION

Two typical aspects of the present invention may briefly be described as follows:

1. A method of preparing data for controlling the sequence of broadcasting, which method comprises: a stage at which a marker for identifying the contents to be broadcast that is set on a broadcasting material is detected and converted to time-related data; a stage at which a command for the contents to be broadcast that correspond to said time-related data is entered into a broadcast sequence control unit; and a stage at which broadcast sequence control data is edited manually or automatically on the basis of said contents of to be broadcast and the data indicating the time required to broadcast said contents.

2. An apparatus for preparing data for controlling the sequence of broadcasting, which apparatus comprises: a broadcasting material editing unit that edits a broadcasting material such as a broadcasting telecine film or broadcasting video tape, an adapter with which the broadcasting material related information from said broadcasting material editing unit is converted to time-related data; a command only keyboard for preparing broadcast sequence control data; an I/O device that feeds a broadcast sequence control unit with an output signal from said command only keyboard and an output signal from said adapter; the broadcast sequence control unit which performs the necessary operations for preparing broadcast sequence control data; and an output device for storing or recording the broadcast sequence control data which has been processed with said broadcast sequence control unit.

According to the first aspect of the present invention, a marker for identifying the contents to be broadcast that is set on a broadcasting material is detected and converted to time-related data, a command for the contents to be broadcast that correspond to said time-related data is entered into a broadcasting sequence control unit, and broadcast sequence control data is edited manually or automatically on the basis of said contents to be broadcast and the data indicating the time required to broadcast said contents. This method not only reduces the chance of broadcast accidents of taking place on account of incorrect Q sheets but also shortens the editing time that is required to prepare broadcast sequence control data and Q sheets.

An embodiment of the present invention is described hereinafter more specifically with reference to the accompanying drawings.

Figure 1:
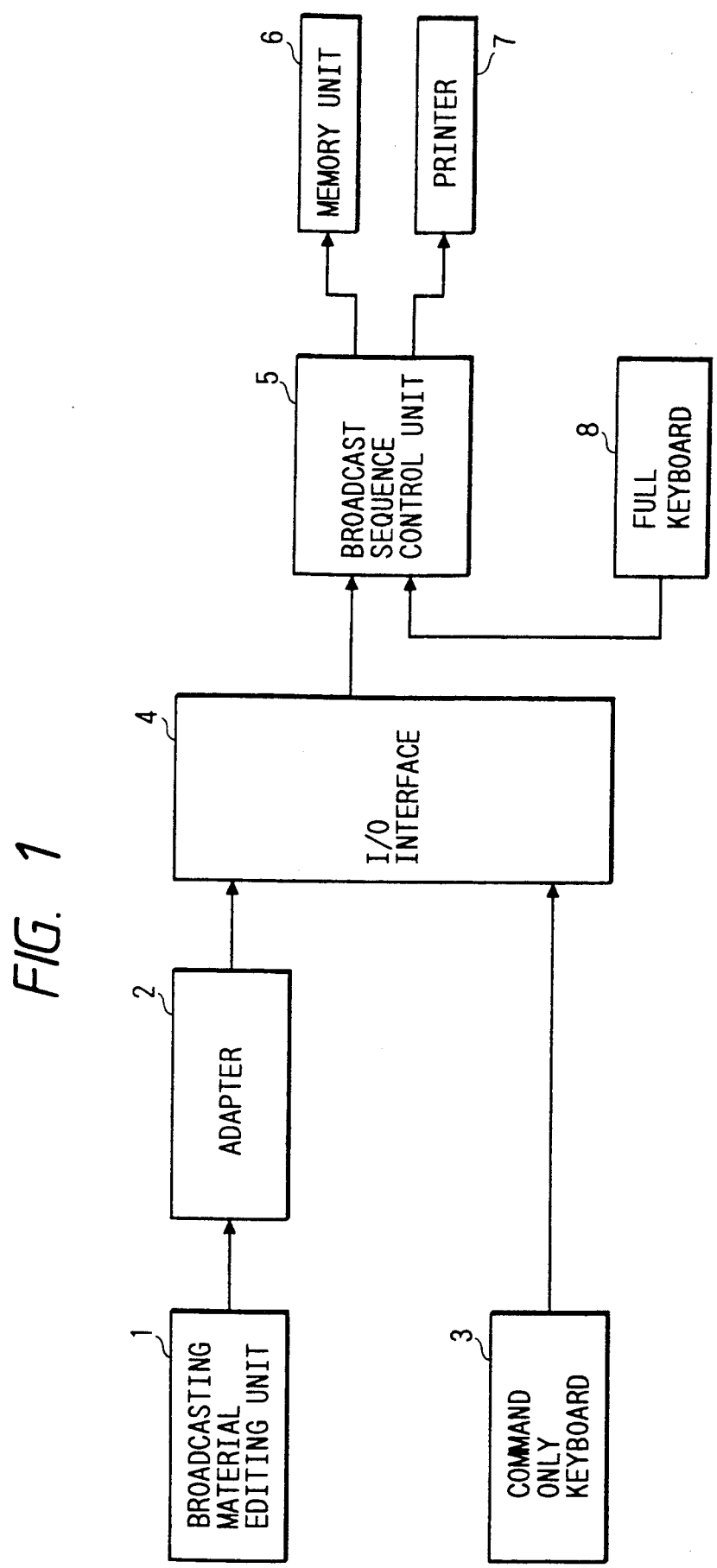
FIG. 1 shows a method of preparing broadcast sequence control data according to an embodiment of the present invention, together with the system configuration of the apparatus for implementing said method.
Figure 2:
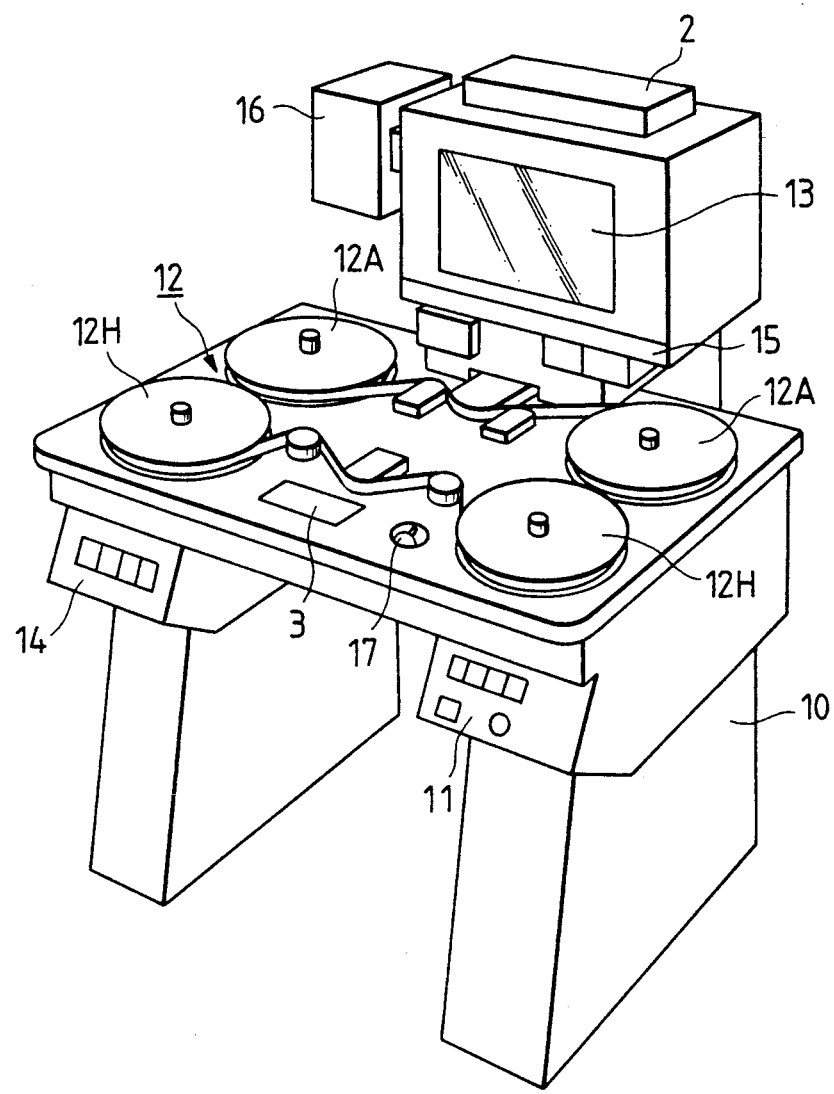
FIG. 2 is a perspective view showing diagrammatically a broadcasting material editing unit that is to be used for implementing the method of preparing broadcast sequence control data according to the embodiment shown in FIG. 1.

FIG. 1 is a diagram showing a method of preparing broadcast sequence control data according to an embodiment of the present invention, together with the system configuration of the apparatus for implementing said method. FIG. 2 is a perspective view showing diagrammatically a broadcasting material editing unit that is to be used for implementing the method of preparing broadcast sequence control data according to the embodiment shown in FIG. 1.

As shown in FIG. 1, the system configuration of the apparatus for preparing broadcast sequence control data according to the embodiment under consideration comprises: a broadcasting material editing unit 1 for editing a broadcasting material such as a broadcasting telecine film or broadcasting video tape; an adapter 2 through which various pieces of broadcasting material related information (e.g. frame signal, film detection signal, stop signal, sequence direction signal, CUE sensor signal, etc.) from the broadcasting material editing unit 1 are passed as they are converted to time-related data; a command only keyboard 3 for preparing broadcast sequence control data; and I/O interface 4 which feeds an output signal from the command only keyboard 3 and an output signal from the adapter 2 into a broadcast sequence control unit 5 that is composed of a personal computer, etc.; the broadcast sequence control unit 5 for performing the necessary operations for preparing broadcast sequence control data; a storage unit 6 (e.g. a floppy disk) and a printer 7 that stores and records the broadcast sequence control data which has been processed with the broadcast sequence control unit 5; and a full keyboard 8 that displays on the broadcast sequence control unit 5 the broadcast sequence control data or Q sheet which have been prepared with said broadcast sequence control unit 5, that checks to see whether the displayed broadcast sequence control data or Q sheet is correct or not, and that corrects or further processes the data if it contains any error. The broadcast sequence control unit 5 also has an information processing capability.

As shown in FIG. 2, the workstation 10 of the broadcasting material editing unit 1 is furnished with a broadcasting material editing operating panel 11 and a sound volume control operating panel 14.

Figure 3:
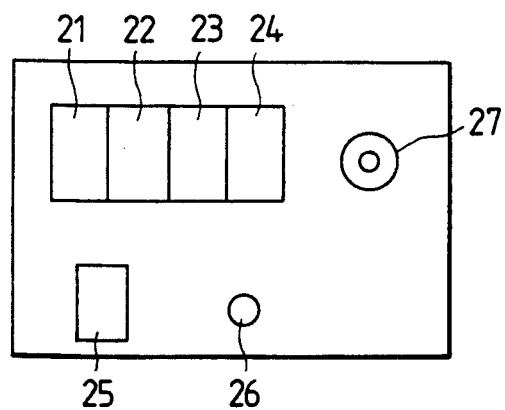
FIG. 3 shows diagrammatically the editing operating panel on the broadcasting material editing unit shown in FIG. 2.

Details of the broadcasting material editing operating panel 11 are shown in FIG. 3. It is furnished with a main switch 25, a sound amplifying switch 21, a screen light source switches 22 and 23, a table illuminating stand switch 27, a magnifier light source switch 24, and a main switch ON indicating lamp 26.

Figure 4:
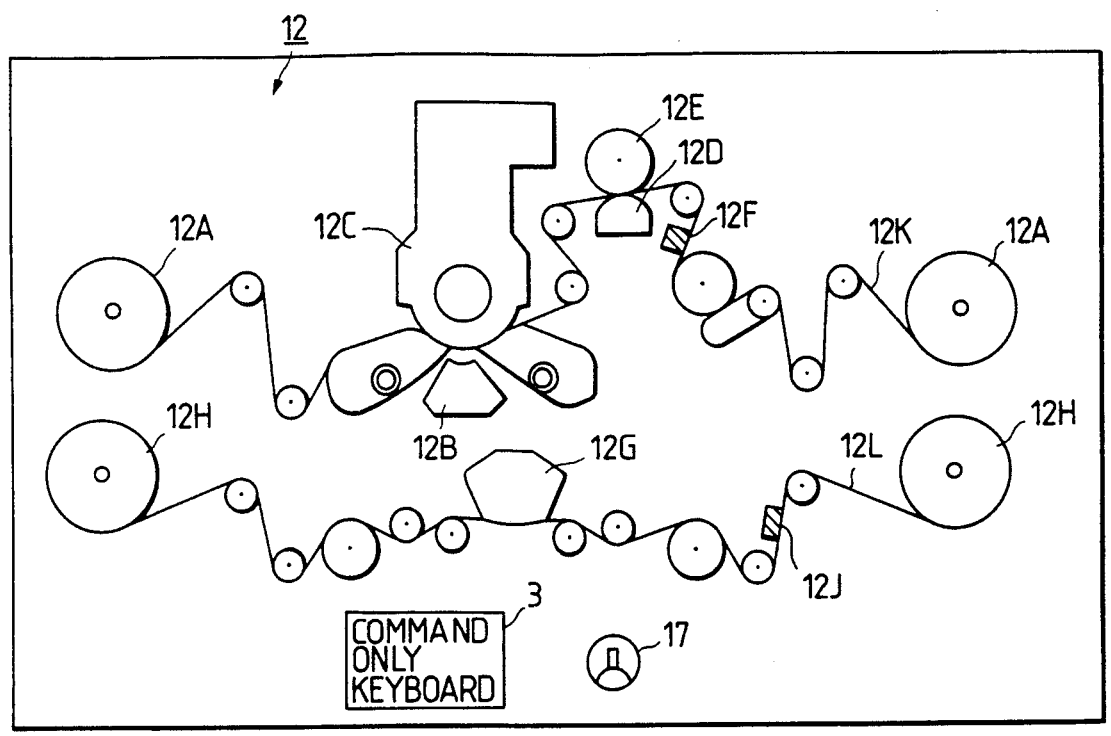
FIG. 4 shows the layout of the broadcasting material processing section mounted on the workstation table of the broadcasting material editing unit shown in FIG. 2.

The top face of the table on the workstation 10 is furnished with a broadcasting material processing unit 12 details of which are shown in FIG. 4. It comprises the following basic components: a telecine film plate 12A; a light source prism 12B; alight receiving prism lens 12C; an optical record/reproduce lamp 12D; COMMAG/optical reproduce head 12E; a film length detecting sensor 12F which detects a slip of silver-coated paper (marker) for film length detection; a record/reproduce head 12G; a magnetic recording film plate 12H; and a film length detecting sensor 12J which detects a marker for detection of the length of a magnetic recording film. Also shown in FIG. 4 are a telecine film 12K and the magnetic recording film 12L.

A monitor screen 13 is mounted on the side remote from the table on the workstation 10. A universal counter 15 for detecting and displaying the time required for broadcasting the contents of interest is provided beneath the monitor screen 13, and the adapter 2 is disposed on top of the screen. A speaker box 16 is attached to the lateral side of the screen 13.

Figure 5:
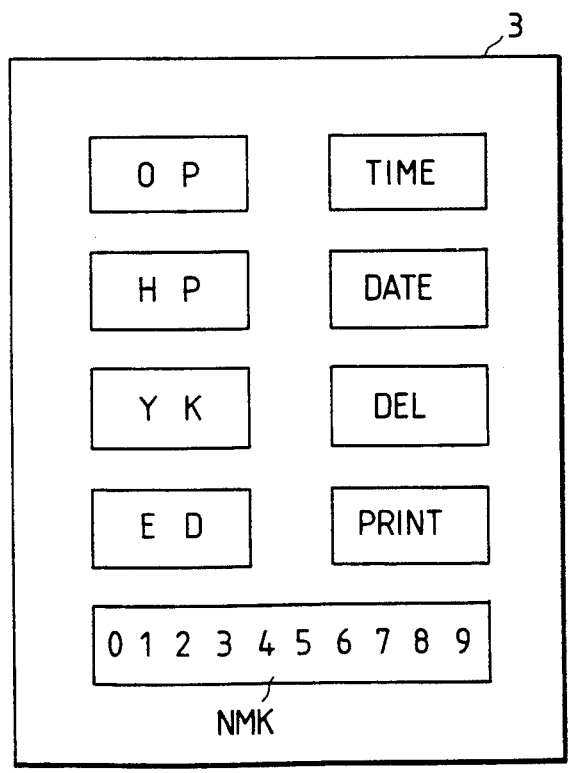
FIG. 5 shows diagrammatically the command only keyboard shown in FIG. 1.

As shown in FIG. 2, the command only keyboard 3 is mounted on the workstation table. As shown in FIG. 5, the keyboard 3 is furnished with an opening program key OP for guiding the program on the air by indicating such pieces of information as the title of the program, music, producing staff, performers, etc., a program-on-the-air key HP, a preview program key YK for announcing the coming program, and an ending key ED for putting such items as music, producing staff and performers on the air at the end of the program. When depressed, the opening program key OP, program-on-the-air key HP, preview program key YK and ending key ED will supply associated pieces of data into the broadcast sequence control unit 5.

The command only keyboard 3 is also furnished with a broadcasting time setting key TIME for feeding the broadcast sequence control unit 5 with the time-related data (i.e., hour, minute and second) that has been displayed on the universal counter 15 which detects and displays the time required for broadcasting the contents of interest, a broadcasting day setting key DATE for entering the date when the program is to be put on the air, a clear key DEL for clearing the contents that have been set by depressing keys on the command only keyboard 3, a print key PRINT for printing out the contents that have been set by depressing keys on the command only keyboard 3, and a numeric key NMK composed of keys denoting Arabic numerals. The numeric key NMK is used especially to enter such pieces of information as the program number (NO) and the date when the program is to be put on the air. A variable speed control lever 17 is located on the right-hand side of the command only keyboard 3 (see FIGS. 2 and 4).

The I/O interface 4 is to be installed in the interior of the broadcast sequence control unit 5 such as a personal computer.

Details of the broadcast sequence control data and Q sheet are described below.

As shown in FIG. 6, a Q sheet contains in edited form various pieces of broadcasting-related information such as the date when a program of interest is to be put on the air, the time of broadcasting, the broadcasting material, the program, the program division number identifying the individual contents to be broadcast.

A marker, say, a slip of silver-coated paper, for identifying the contents to be broadcast that has been set on the broadcasting material with the broadcasting material editing unit 1 (see FIGS. 1 and 2) is detected with the film length detecting sensor 12F (see FIG. 4) and converted to time-related data with the adapter 2 (see FIG. 1), and a command for the contents to be broadcast that correspond to the time-related data is entered into the broadcast sequence control unit 5 (see FIG. 1), which automatically sets the contents to be broadcast and the data indicating the time required to broadcast them, namely, the duration of time for which the broadcasting material is to be put on the air (in terms of hours, minutes and seconds). Selected keys on the command only keyboard 3 (see FIG. 1) are then depressed to edit various pieces of broadcast sequence control data such as the date when the program is to be put on the air, the broadcasting material, program, the division number, etc. (see FIG. 7). The edited broadcast sequence control data is to be stored in the memory unit shown in FIG. 1.

The method of preparing a Q sheet using the abovedescribed apparatus for preparing broadcast sequence control data is hereunder described briefly for better understanding of the present invention.

By referring to FIG. 1, broadcast sequence control data that is stored in the memory unit 6 and that is composed of such pieces of information as the duration of time (hour, minute and second) for which each of the broadcasting materials of interest is to be put on the air, the date of broadcasting, the broadcasting materials of interest, the program and the program division number is retrieved from the memory through manipulation of the full keyboard 8 and displayed on the broadcast sequence control unit 5, and relevant pieces of information are successively edited to prepare a Q sheet as shown in FIG. 6. If the broadcast sequence control data is found to contain some error, it is corrected or otherwise processed through manipulation of the full keyboard 8 and the editing job is continued until the correct Q sheet is obtained. When the necessary editing operation is completed, the contents of the prepared Q sheet are stored in the memory unit 6 and at the same time, they are printed by means of the printer 7.

As will be understood from the foregoing description, the method according to the embodiment under consideration proceeds as follows: a marker, say, a slip of silver-coated paper, for identifying the contents to be broadcast that has been st on a broadcasting material with the broadcasting material editing unit 1 (see FIGS. 1 and 2) is detected with the film length detecting sensor 12F (see FIG. 4) and converted to time-related data with the adapted 2 (see FIG. 1), and a command for the contents to be broadcast that correspond to the time-related data is entered into the broadcast sequence control unit 5 (see FIG. 1), which automatically sets the contents to be broadcast and the data indicating the time required to broadcast them, namely, the duration of time for which the broadcasting material is to be put on the air (in terms of hours, minutes and seconds). Since the operator does not need to read any of the broadcasting material related information that is displayed on the broadcasting material editing unit, the chance of broadcast accidents of occurring on account of incorrection Q sheets can be reduced while at the same time, the editing time that is required to prepare broadcast sequence control data and Q sheets is also shortened.

While the present invention has been described in detail with reference to a typical embodiment, it should be understood that the present invention is by no means limited to that particular invention is by no means various other modifications can be made without departing from the spirit and scope of the invention.

As described on the foregoing pages, according to the present invention, a marker for identifying the contents to be broadcast that is set on a broadcasting material is detected and converted to time-related data, a command for the contents to be broadcast that correspond to this time-related data is entered into a broadcasting sequence control unit, and broadcast sequence control data is edited manually or automatically on the basis of said contents to be broadcast and the data indicating the time required to broadcast said contents. This method not only reduces the chance of broadcast accidents of taking place on account of incorrect Q sheets but also shortens the editing time that is required to prepare broadcast sequence control data and Q sheets.

What is claimed is:

1. A method of preparing data for controlling a broadcast sequence, which method comprises: a stage at which a marker identifying information to be broadcast is detected from a broadcasting material and is converted to time-related data; a stage at which a command for said information to be broadcast is entered into a broadcast sequence control unit; and a stage at which broadcast sequence control data is edited manually or automatically on the basis of said information and the data indicating the time required to broadcast said information.

2. An apparatus for preparing data for controlling a broadcasting sequence, which apparatus comprises: a broadcasting material editing unit that edits a broadcasting material such as a broadcasting telecine film or broadcasting video tape, an adapted with which the broadcasting material related information from said broadcasting material editing unit is converted to time-related data; a command only keyboard for preparing broadcast sequence control data; an I/O device that feeds a broadcast sequence control unit with an output signal from said command only keyboard and an output signal from said adapter; the broadcast sequence control unit which performs the necessary operations for preparing broadcast sequence control data; and an output device for storing or recording the broadcast sequence control data which has been processed with said broadcast sequence control unit.

* * * * *